United States Patent
Jin et al.

(10) Patent No.: US 10,963,756 B2
(45) Date of Patent: *Mar. 30, 2021

(54) EMOTION CLASSIFICATION BASED ON EXPRESSION VARIATIONS ASSOCIATED WITH SAME OR SIMILAR EMOTIONS

(71) Applicant: International Business Machines Corporation, Armonk, NY (US)

(72) Inventors: Feng Jin, Beijing (CN); Wen Liu, Beijing (CN); Yong Qin, Beijing (CN); Qin Shi, Beijing (CN); Peng Wang, Beijing (CN); Shi Lei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,701

(22) Filed: Sep. 30, 2019

(65) Prior Publication Data
US 2020/0026957 A1 Jan. 23, 2020

Related U.S. Application Data

(63) Continuation of application No. 15/791,821, filed on Oct. 24, 2017, now Pat. No. 10,489,690.

(51) Int. Cl.
*G06K 9/62* (2006.01)
*G06K 9/00* (2006.01)
(Continued)

(52) U.S. Cl.
CPC .......... *G06K 9/628* (2013.01); *G06F 16/285* (2019.01); *G06K 9/00268* (2013.01);
(Continued)

(58) Field of Classification Search
CPC combination set(s) only.
See application file for complete search history.

(56) References Cited

U.S. PATENT DOCUMENTS 6,961,712 B1  11/2005  Perkowski
7,158,983 B2   1/2007  Willse et al.
(Continued)

OTHER PUBLICATIONS

Non-Final Office Action received for U.S. Appl. No. 15/240,649 dated Jan. 2, 2019, 21 pages.
(Continued)

*Primary Examiner* — Tsung Yin Tsai
(74) *Attorney, Agent, or Firm* — Amin, Turocy & Watson, LLP

(57) ABSTRACT

Techniques are described that facilitate automatically distinguishing between different expressions of a same or similar emotion. In one embodiment, a computer-implemented is provided that comprises partitioning, by a device operatively coupled to a processor, a data set comprising facial expression data into different clusters of the facial expression data based on one or more distinguishing features respectively associated with the different clusters, wherein the facial expression data reflects facial expressions respectively expressed by people. The computer-implemented method can further comprise performing, by the device, a multi-task learning process to determine a final number of the different clusters for the data set using a multi-task learning process that is dependent on an output of an emotion classification model that classifies emotion types respectively associated with the facial expressions.

20 Claims, 9 Drawing Sheets

(51) Int. Cl.
*G06N 20/00* (2019.01)
*G06F 16/28* (2019.01)
*G06N 3/04* (2006.01)
*G06N 3/08* (2006.01)

(52) U.S. Cl.
CPC ......... *G06K 9/00302* (2013.01); *G06K 9/622* (2013.01); *G06N 3/0445* (2013.01); *G06N 3/08* (2013.01); *G06N 20/00* (2019.01)

(56) References Cited

U.S. PATENT DOCUMENTS

| | | | |
|---|---|---|---|
| 7,761,394 B2 | 7/2010 | Acharya et al. | |
| 8,041,082 B1* | 10/2011 | Baluja | G06K 9/00288 382/118 |
| 8,156,154 B2 | 4/2012 | Taranov et al. | |
| 8,280,856 B2 | 10/2012 | Rohan et al. | |
| 8,392,472 B1 | 3/2013 | Gupta et al. | |
| 8,396,708 B2 | 3/2013 | Park et al. | |
| 8,452,773 B1 | 5/2013 | Young | |
| 8,498,906 B2 | 7/2013 | Zmolek | |
| 8,527,893 B2 | 9/2013 | Agrawal et al. | |
| 8,566,306 B2 | 10/2013 | Jones | |
| 8,750,578 B2* | 6/2014 | Neghina | G06K 9/00228 382/118 |
| 8,935,275 B2 | 1/2015 | Rathod | |
| 9,031,293 B2* | 5/2015 | Kalinli-Akbacak | G06F 3/011 382/128 |
| 9,110,922 B2 | 8/2015 | Bengio et al. | |
| 10,579,940 B2* | 3/2020 | Jagmohan | G06N 20/00 |
| 10,642,919 B2* | 5/2020 | Jagmohan | G06N 20/00 |
| 10,657,189 B2* | 5/2020 | Jagmohan | G06N 20/00 |
| 2006/0294086 A1 | 12/2006 | Rose et al. | |
| 2009/0041312 A1* | 2/2009 | Wakasugi | G06K 9/00711 382/118 |
| 2009/0285456 A1* | 11/2009 | Moon | G06K 9/00335 382/118 |
| 2010/0169343 A1 | 7/2010 | Kenedy et al. | |
| 2011/0115937 A1* | 5/2011 | Sassa | G06K 9/00221 348/222.1 |
| 2014/0003662 A1* | 1/2014 | Wang | H04N 19/85 382/103 |
| 2014/0016860 A1* | 1/2014 | Senechal | G16H 30/40 382/159 |
| 2014/0226877 A1* | 8/2014 | Je | G06K 9/00926 382/118 |
| 2014/0310208 A1* | 10/2014 | Fasel | G06K 9/4619 706/12 |
| 2015/0071557 A1* | 3/2015 | Movellan | G06K 9/00677 382/225 |
| 2016/0026617 A1 | 1/2016 | Avner et al. | |
| 2016/0062986 A1 | 3/2016 | Seuss | |
| 2016/0180722 A1 | 6/2016 | Yehezkel et al. | |
| 2017/0109603 A1 | 4/2017 | Wang et al. | |
| 2017/0160813 A1 | 6/2017 | Divakaran et al. | |
| 2017/0330029 A1* | 11/2017 | Turcot | G06K 9/00308 |
| 2018/0137432 A1* | 5/2018 | Chen | G10L 15/02 |
| 2018/0144649 A1* | 5/2018 | el Kaliouby | G06F 16/337 |
| 2019/0005313 A1* | 1/2019 | Vemulapalli | G06N 20/00 |
| 2019/0122071 A1* | 4/2019 | Jin | G06K 9/00268 |

OTHER PUBLICATIONS

Patwardhan et al., "Effective INformation Extraction with SEmantic Affinity Patterns and Relevant Regions". Jun. 2007. Proceedings of the 2007 Joint Conference on Empirical Methods in Natural Language Processing and Computational Natural Language Learning. pp. 717-727.

Chiao et al., "Looking for Candidate Translational Equivalents in Specialized, Comparable Corpora", Proceedings of the 19th International Conference on Computational Linguistics (COLING '02), 2002, vol. 2, Association for Computational Linguistics, Stroudsburg, PA, USA, 6 pages.

Udupa et al., "Mining Named Entity Transliteration Equivalents from Comparable Corpora", Proceedings of the 17th ACM Conference on Information and Knowledge Management (CIKM '08), 2008, pp. 1423-1424, ACM, New York, NY, USA.

Vulic et al., "Monolingual and Cross-Lingual Information Retrieval Models Based on (Bilingual) Word Embeddings", Proceedings of the 38th International ACM SIGIR Conference on Research and Development in Information Retrieval (SIGIR '15), 2015, pp. 363-372, ACM, New York, NY, USA.

Zahran et al., "Word Representations in Vector Space and their Applications for Arabic", Computational Linguistics and Intelligent Text Processing, 2015, pp. 430-443, vol. 9041, Springer International Publishing.

Mikolov et al., "Exploiting Similarities among Languages for Machine Translation", Sep. 17, 2013, 10 pages.

List of IBM Patents or Applications Treated as Related.

Dobrisek et al., "Towards Efficient Multi-Modal Emotion Recognition," International Journal of Advanced Robotic Systems,© 2013, 10 pages.

Non-Final Office Action received for U.S. Appl. No. 15/240,664 dated Jan. 2, 2019, 33 pages.

Non-Final Office Action received for U.S. Appl. No. 15/791,821 dated Apr. 4, 2019, 24 pages.

Non-Final Office Action received for U.S. Appl. No. 15/240,660 dated Jun. 28, 2019, 25 pages.

Notice of Allowance received for U.S. Appl. No. 15/240,649 dated Jul. 1, 2019, 24 pages.

Notice of Allowance received for U.S. Appl. No. 15/791,821 dated Jul. 17, 2019, 30 pages.

Final Office Action received for U.S. Appl. No. 15/240,664 dated Aug. 21, 2019, 15 pages.

* cited by examiner ns EMOTION CLASSIFICATION BASED ON
EXPRESSION VARIATIONS ASSOCIATED
WITH SAME OR SIMILAR EMOTIONS

TECHNICAL FIELD

This application relates to computer-implemented techniques facilitating automatically distinguishing between different expressions of a same or similar emotion.

SUMMARY

The following presents a summary to provide a basic understanding of one or more embodiments of the invention. This summary is not intended to identify key or critical elements, or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products that provide for automatically distinguishing between different expressions of a same or similar emotion.

According to an embodiment of the present invention, a system can comprise a memory that stores computer executable components and a processor that executes the computer executable components stored in the memory. The computer executable components can comprise a clustering component that partitions a data set comprising facial expression data into different clusters of the facial expression data based on one or more distinguishing features respectively associated with the different clusters, wherein the facial expression data reflects facial expressions respectively expressed by people. The computer executable components can further comprise a multi-task learning component that determines a final number of the different clusters for the data set using a multi-task learning process that is dependent on an output of an emotion classification model that classifies emotion types respectively associated with the facial expressions.

In some embodiments, elements described in connection with the disclosed systems can be embodied in different forms such as a computer-implemented method, a computer program product, or another form.

DETAILED DESCRIPTION

Figure 1:
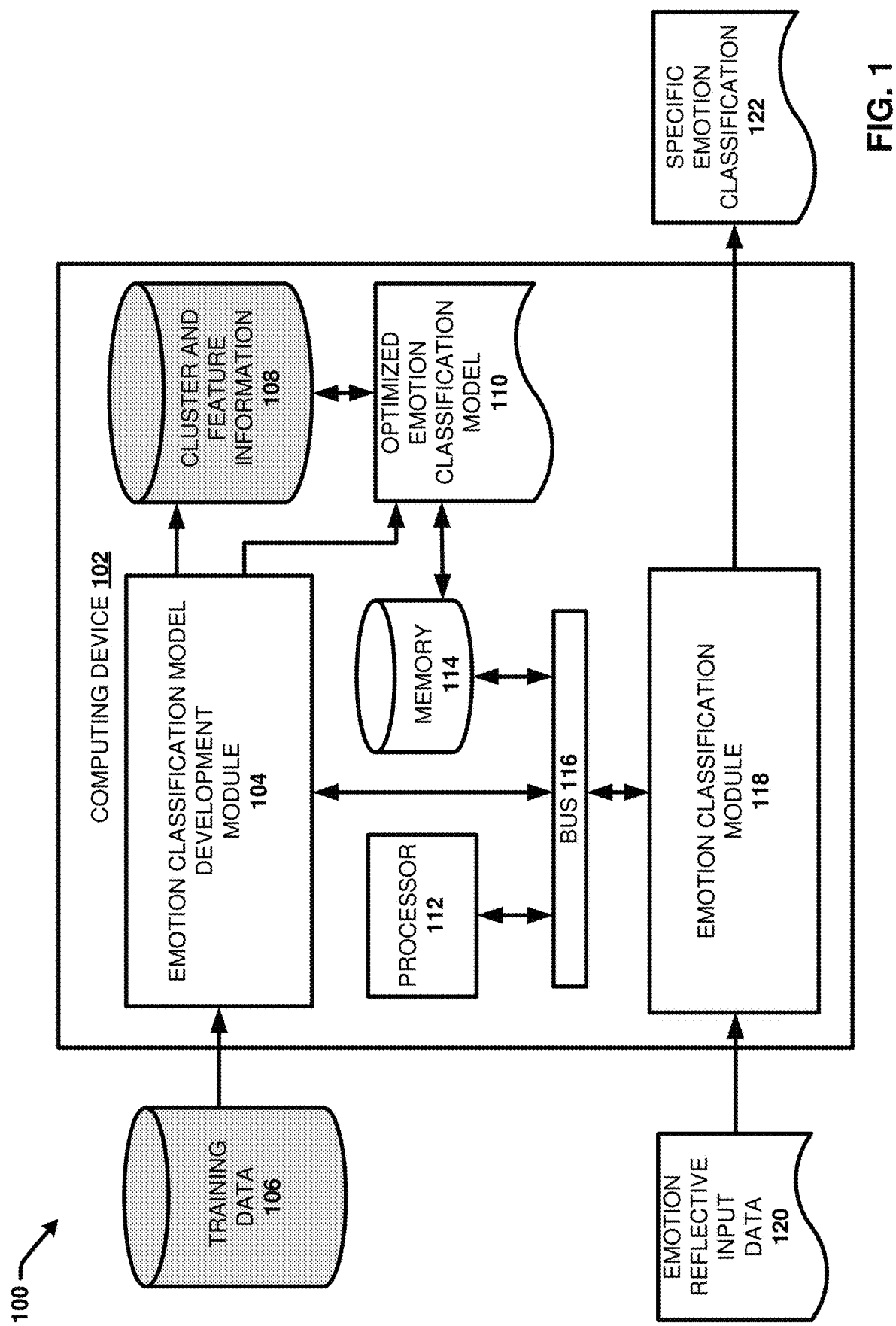
FIG. 1 illustrates a block diagram of an example, non-limiting system that facilitates automatically distinguishing between different expressions of a same or similar emotion in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The subject disclosure provides systems, computer-implemented methods, apparatus and/or computer program products that facilitate automatically distinguishing between different expressions of a same or similar emotion. Understanding human emotions is a key component to improve human-computer or human-machine interactions. For example, various computer implemented systems can use feedback information regarding user emotions to tailor provision of content and services accordingly. One approach used by computing systems to determine an emotional state of a user interacting therewith can involve analysis of facial expression information reflected in one or more images captured of the face of the user. Facial expression based emotion classification techniques generally involves the classification of an emotion type (e.g., joy, surprise, disgust, sadness, anger, fear, neutral, etc.) reflected in facial expression data based on defined facial feature patterns reflected in the facial expression data. Other types of computer automated emotion classification involve analysis of patterns corresponding to defined emotion types reflected in speech data (e.g., based on variation in speech content, tone of voice, prosody and the like), text data, gesture data, physiological signals, and the like.

The subject disclosure provides systems facilitating generating and applying a new emotion classification model that provides improved accuracy and granularity associated classifying emotions. In this regard, the disclosed emotion classification methods can facilitate accurately distinguishing between a wide spectrum of different emotion types, including discrete emotions and dimensional emotions. The disclosed technique can further provide for distinguishing between variations in the manner in which different people express same or similar emotions. For example, some people express same or similar emotions differently using different facial expressions, different speech, different tone of voice and prosody, different text, different gestures, different physiological signals and the like. For instance, with respect to facial expressions, some people associated with different demographic profiles (e.g., different ages, different backgrounds, etc.) have been found to consistently express emotions with different variations in their facial expressions. The degree of variation can often result in false emotion classification results using existing emotion classification models.

In one or more embodiments, the subject disclosure provides techniques for developing a highly granular and accurate emoting classification model using an adversarial multi-task learning framework. In this regard, the disclosed techniques can combine an emotion classification model and a clustering model and trains both models on the same set of input data using an adversarial multi-task learning process. More particularly, the clustering model can determine clusters corresponding to different subsets of the input data based on the accuracy of an emotion classification task as applied to the respective clusters. The adversarial multi-task learning process thus results in task dependent clustering by the clustering model, such that the output of the clustering model can be dependent on the output of the emotion classification model.

For example, in some embodiments, the input data can include facial image data corresponding to facial images of a large number of people (e.g., thousands, tens of the thousands, etc.) with facial expressions corresponding to known emotion types. According to this example, the clustering model can determine different clusters of the input data that respectively have distinguishing facial feature representations (e.g., one or more distinguishing bottleneck features). In various implementations, the multi-task learning process can involve iteratively determining an incremental number of clusters and applying the emotion classification model to the respective clusters at each (or in some implementations one or more) iteration. The clustering model can repeat the iterative clustering while incrementally increasing the clustering number until the emotion classification rate for the respective clusters drops. The final output of the adversarial multi-task learning process can include a final cluster number, wherein the respective clusters are associated with one or more distinguishing feature representations (e.g., one or more distinguishing bottleneck features) that correspond to known emotion types. In some embodiments, the emotion classification model can be trained on the new distinguishing feature representations (e.g., using the same training input data or new training data) to learn how to accurately recognize and classify facial feature data that includes the new distinguishing facial feature representations.

Although various embodiments of the subject disclosure are described in association with developing an emotion classification model that classifies emotions associated with facial feature representations, it should be appreciated that the disclosed techniques can be applied to other types of emotion classification systems to improve their granularity and accuracy. For example, in some implementations the emotion classification model can include a model that classifies emotions based on variations in speech data (e.g., variations in content, tone of voice, prosody, etc.), text data, gesture data, physiological signals, and the like. In other embodiments, the emotion classification model can include a combined model that classifies emotion types based on a combination of two or more different types of input data associated with a single emotion expression of a user.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates automatically distinguishing between different expressions of a same or similar emotion in accordance with one or more embodiments of the disclosed subject matter. System 100 or other systems detailed herein can provide substantial technical improvements in the field of automated (e.g., machine or computer determined) emotion classification by providing a method for generating and applying an emotion classification model that can accurately classy a wide array of emotion types at a level of specificity that provides for distinguishing between different expressions of a same or similar emotion.

The disclosed embodiments employ an adversarial multi-task learning process that can automatically cluster a data set representative of expressions of emotions from different people (e.g., facial images) into a final number of clusters respectively associated with distinguishing feature representations, wherein the distinguishing feature representations are associated with known emotion types. By employing an adversarial multi-task learning process, the final cluster number and corresponding feature representations are dependent on the output of the emotion classification task. As a result, the disclosed techniques are data driven and can be performed without using any metadata information identifying distinguishing characteristics associated with the different people from which the emotion expression input data is associated with. In this regard, the disclosed systems do not require determining or employing information regarding known demographic characteristics of the respective users represented in the input data (e.g., a known age, background, language, etc. for each user).

System 100 and/or the components of the system 100 or other systems disclosed herein can be employed to use hardware and/or software to solve problems that are highly technical in nature, that are not abstract, and that cannot be performed as a set of mental acts by a human. For example, a human could not possibly automatically (e.g., within a matter of seconds or less) and consistently accurately determine a specific emotional state of a user based on observation of a single facial expression of the user, let alone repeatedly perform such an operation over and over for hundreds to millions of users accessing a system that employs the disclosed automated emotion classification techniques to tailor provision of services to users. System 100 and/or components of system 100 or other systems described herein can also be employed to solve new problems that arise through advancements in technology, computer networks, the Internet, and the like. For example, system 100 and/or components of system 100 or other systems provide for automatically and accurately determining, by a computing device, an emotional state of a user in association with interaction between the user and the computing device or another machine, thereby allowing the computing device or the other machine to tailor operations (e.g., actions, provision of information, provision of services and the like) based on the emotional state of the user. Accordingly, the disclosed techniques facilitate improved user-machine interactions.

Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, in the embodiment shown, system 100 includes a computing device 102 that includes an emotion classification model development module 104 and an emotion classification module 118, which can respectively correspond to machine-executable components. System 100 also includes various electronic data sources and data structures comprising information that can be read by, used by and/or generated by the emotion classification model development module 104 and/or the emotion classification module 118. For example, these data sources and data structures can include but are not limited to: the training data 106, the cluster and feature information 108, the optimized emotion classification model 110, the emotion reflective input data 120 and the specific emotion classification 122.

The computing device 102 can include or be operatively coupled to at least one memory 114 and at least one processor 112. The at least one memory 114 can further store executable instructions (e.g., the emotion classification model development module 104 and the emotion classification module 118) that when executed by the at least one processor 112, facilitate performance of operations defined by the executable instruction. In some embodiments, the memory 114 can also store the various data sources and/or structures of system 100 (e.g., the training data 106, the cluster and feature information 108, the optimized emotion classification model 110, the emotion reflective input data 120 and the specific emotion classification 122, and the like). In other embodiments, the various data sources and structures of system 100 can be stored in other memory (e.g., at a remote device or system), that is accessible to the computing device 102 (e.g., via one or more networks). The computing device 102 can further include a device bus 116 that communicatively couples the various components and data sources of the computing device 102 (e.g., the emotion classification model development module 104, the emotion classification module, the processor 112, the memory 114, the cluster and feature information 108 and the optimized emotion classification model 110). Examples of said processor 112 and memory 114, as well as other suitable computer or computing-based elements, can be found with reference to FIG. 10, and can be used in connection with implementing one or more of the systems or components shown and described in connection with FIG. 1 or other figures disclosed herein.

In some implementations, the computing device 102, and/or the various components and data sources of system 100 can be communicatively connected via one or more networks. Such networks can include wired and wireless networks, including but not limited to, a cellular network, a wide area network (WAD, e.g., the Internet) or a local area network (LAN). For example, the computing device 102 can communicate with an external device providing the training data 106, the emotion reflective input data 120, and (vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. The computing device 102 can thus include hardware (e.g., a central processing unit (CPU), a transceiver, a decoder), software (e.g., a set of threads, a set of processes, software in execution) or a combination of hardware and software that facilitates communicating information between the computing device 102 and externals systems, sources and devices.

In various embodiments, the emotion classification model development module 104 can perform various functions that are directed to developing a new emotion classification model that provides highly granular and accurate emotion classifications. In this regard, the emotion classification model development module 104 can employ a multi-task learning process to train both an emotion classification model and a clustering model on a set of training data 106 comprising user data reflective of different emotions, such as facial images of users expressing different emotions. The multi-task learning process results in determining different clusters of the emotion expression data respectively associated with different distinguishing feature representations or feature vectors, wherein the different feature vectors correspond to distinct emotion types. The multi-task learning process is a data driven process, wherein the number of clusters determined and the distinguishing feature vectors associated therewith are based on automated clustering (e.g., using a clustering model) of feature data extracted from the input data (e.g., facial images), and accuracy of classifying the respective user emotion representations (e.g., emotion expressions reflected in the facial images) included in the respective clusters with their correct emotion states. The clustering process can be iteratively performed to generate an increasing number of clusters until the emotion classification rate drops. As a result, the final number of clusters will reflect the most granular subsets of features and their corresponding emotion states that can be accurately classified by the emotion classification model. The emotion classification model development module 104 can further train the emotion classification model to recognize and classify emotional states based on the new feature vectors, thereby resulting in an optimized emotion classification model capable of determining highly granular and accurate emotion classifications. In the embodiment shown, this new emotion classification model is represented as the optimized emotion classification model 110.

Various embodiments of the disclosed techniques are described in association with developing an optimized emotion classification model 110 that can be configured to classify emotion states based on facial expression data. With these embodiments, the training data 106 can include a set of facial expression data corresponding to facial expressions expressed by different people, wherein individual facial expressions are associated with known emotion types. For example, the facial expression data can include raw images of facial expressions expressed by thousands (or more or less) of people, wherein the respective images are associated with known emotion types. In some implementations, each person (or one or more persons) can be associated with a plurality of images corresponding to different types of emotions (e.g., the training data 106 can include several images for each person, wherein each of the images (or one or more of the images) shows the person expressing a different emotion type).

In some embodiments, the different emotions can include discrete emotions. For example, in the field of emotion classification, there are six discrete emotion types, including joy, surprise, disgust, sadness, anger, and fear. In other embodiments, the different emotions can include discrete emotions as well as dimensional emotions. For example, dimensional models of emotion attempt to conceptualize human emotions by defining where they lie in two or three dimensions. Most dimensional models incorporate valence and arousal or intensity dimensions. Dimensional models of emotion suggest that a common and interconnected neurophysiological system is responsible for all affective states. These models contrast theories of basic emotion, which propose that different emotions arise from separate neural systems. The two-dimensional models that are most prominent are the circumplex model, the vector model, and the positive activation model.

With reference back to FIG. 1, in one or more embodiments, the emotion classification model development module 104 can process the training data 106 to develop the optimized emotion classification model 110 that can distinguish between different manners of expression of a same or similar emotion type. In this regard, due to the training data 106 comprising emotion representations for different people, wherein at least some of the different people express a same or similar motion in different manners, some clusters will correspond to same emotion states, however their feature vectors will be different, meaning that two or more different feature vectors determined can reflect a same or similar emotion. For example, some people have been found to express same or similar emotions differently with their facial expressions. For example, in some implementations, some people associated with different demographic profiles (e.g., age, background, etc.) have been found to employ different variations in their facial expressions in association with expressing a same or similar emotions. In other implementations, people with different physical facial appearances (e.g., bone structure, face fullness, etc.) can have different variations in their facial expression of a same or similar emotion. For example, one person may be accustomed to expressing the feeling of joy with a wide mouth smile while another may be accustomed to expressing the feeling of joy with a closed mouth smirk.

It should be appreciated that the nuances between different expressions of same or similar emotions can increasingly complicate the emotion classification problem as the size and diversity of the population classified increases and as the types of emotion that are classified become more granular (e.g., to include dimensional emotion types). Accordingly, emotion classifications model that use a single facial feature representation or vector to classify respective emotion types (e.g., a single feature representation for joy, another single feature representation for sadness, etc.) can provide substantially inaccurate classification results.

With reference again to FIG. 1, in one or more embodiments, the emotion classification model development module 104 can perform a two-part process to generate the optimized emotion classification model 110. The first part of the process can involve employing an adversarial multi-task learning process to cluster the training data 106 into different clusters respectively associated with different facial feature representations or vectors (respectively comprising of one or more bottleneck feature), wherein the different facial feature representations respectively correspond to distinct emotion types. As described in greater detail with reference to FIGS. 2, 3 4 and 5, the first part of the two-part process includes determining a final number of different clusters of the training data, wherein the final number is determined based on the accuracy of emotion classification associated with the respectively clusters. The emotion classification can involve usage of a standard or known machine learning emotion classification model, such as a neural-network model or another defined emotion classification model that is configured to process the training data employed (e.g., emotion classification based on facial images). The output of the first part of the two-part process can include information identifying the final clusters, the distinguishing feature representations associated with the respective clusters, and the emotion types associated with respective distinguishing feature representations. This output information is represented in system 100 as the cluster and feature information 108. The cluster and feature information 108 can be embodied in any suitable machine-readable format.

As described in greater detail with reference to FIGS. 2, 3, 4 5 and 6, the second part of the two-part process can involve employing the cluster and feature information 108 to train the emotion classification model used in the first part to learn how to recognize the distinguishing feature representations corresponding to the determined emotion types included in the cluster and feature information and classify the facial expressions accordingly. For example, in implementations in which the respective feature representations included in the cluster and feature information 108 correspond to bottleneck features, the emotion classification model development module 104 can include the final bottleneck features as additional features to append to the emotion recognition network input and train the emotion classification model to identify end user the bottleneck features to tailor emotion classification to reflect the impact of the bottleneck features. Once the emotion classification model has been trained to recognize and classify facial expression data based on the determined feature representation included in the cluster and feature information 108, the emotion classification model can become the optimized emotion classification model 110.

The emotion classification module 118 can further employ the optimized emotion classification model 110 to automatically classify user emotions reflected in new emotion expression. In this regard, the emotion classification module 118 can receive emotion reflective input data 120 for a user and apply the optimized emotion classification model 110 to determine a specific emotion classification 122 reflected by the emotion reflective input data. For example, in embodiments in which the optimized emotion classification model 110 comprises a neural network model configured to classify facial expression data, the emotion reflective input data 120 can include one or more images captured of the face of the user. The specific emotion classification 122 output can include for example a discrete emotion type and in some implementations, a dimensional emotion type.

For example, because the optimized emotion classification model 110 has been trained to recognize the distinct feature vectors included in the cluster and feature information 108 and classify emotions with the corresponding emotion states associated therewith, the output of the optimized emotion classification model 110 can include the more granular emotion states associated with the distinct feature vectors determined for each of the final clusters. The output the optimized emotion classification model 110 can also include different emotion classification for different expressions of a same or similar emotion. In this regard, due to the training data 106 comprising emotion representations for different people, wherein at least some of the different people express a same or similar motion in different manners, some clusters will correspond to same emotion states, however their feature vectors will be different, meaning that two or more different feature vectors determined can reflect a same or similar emotion. Accordingly, because the optimized emotion classification model 110 can be trained on these distinct feature vectors to classify their corresponding emotion states, the optimized emotion classification model 110 will be able to identify the respective feature vectors in the emotion reflective input data 120. As a result, the emotion classification module 118 can distinguish between variations in facial expression representations associated with different people having different demographic profiles (e.g., age, background, etc.).

However because the clusters and corresponding feature representations included in the cluster and feature information 108 are determined using a data driven process that does not use metadata input identifying demographic characteristics associated with the people in the input images, the emotion classification module 118 can distinguish between different emotion types associated with different demographic profiles without determining or using metadata information identifying the demographic profile of the user for which the emotion reflective input data 120 is based. For example, as described in greater detail with reference to FIGS. 2 and 3, the clustering process results in drilling down the training data 106 into granular clusters, wherein the data within each cluster has similar observations and wherein the different clusters have distinct differences. For example, one cluster can correspond to facial expressions reflective of a happy state while another cluster can correspond to facial expressions reflective of a sad emotion state. Based on more granular clustering resulting from the clustering process, two clusters associated with the sad emotion state for example can differ based on the manner in which the sad emotion state is expressed in each cluster. As described above, one observed correlation between different expressions of a same emotional state can be based on demographic profiles of the people associated with each expression. For example, with respect to the two clusters associated with different expression of the sad emotion state, one cluster can reflect users of a first demographic profile while the other can reflect users of a second demographic profile. However, because the clustering process is a data driven based on clustering features extracted from the input data (e.g., facial image based features), the correlation between a distinct cluster of facial expression data and a particular demographic profile does not matter and thus does not need to be determined using the disclosed techniques. In this regard, the cluster and feature information 108 generated from the multi-task learning process correlates distinct feature representations or feature vectors with distinct emotion states. Although two distinct feature vectors can correspond to the same emotion state, the differences between potential demographic profile correlations associated with the distinct feature vectors does not matter for purposes of employing the distinct vectors to classify emotion states.

Accordingly, the emotion classification module 118 can provide a less invasive method for emotion classification and does not require demographic profiling and the associated authorization procedures often required to perform demographic profiling. Further, because the emotion classification module 118 does not require determining or applying metadata information in association with emotion classification, the emotion classification module 118 can perform emotion classification with decreased processing time relative to alternative emotion classification methods.

Although various embodiments of system 100 are described in association with developing an optimized emotion classification model 110 that classifies emotions based on facial expression data, it should be appreciated that the disclosed techniques can be applied to other types of emotion classification systems to improve their granularity and accuracy. For example, in some embodiments, system 100 can be employed to generate an optimized emotion classification model 110 that can be configured to classify emotions based on variations in speech data (e.g., prosody detection), text data, gesture data, physiological and the like. In other implementations, the emotion classification model can include a combined model that classifies emotion types based on a combination of feature input (e.g., facial features and speech data).

Figure 2:
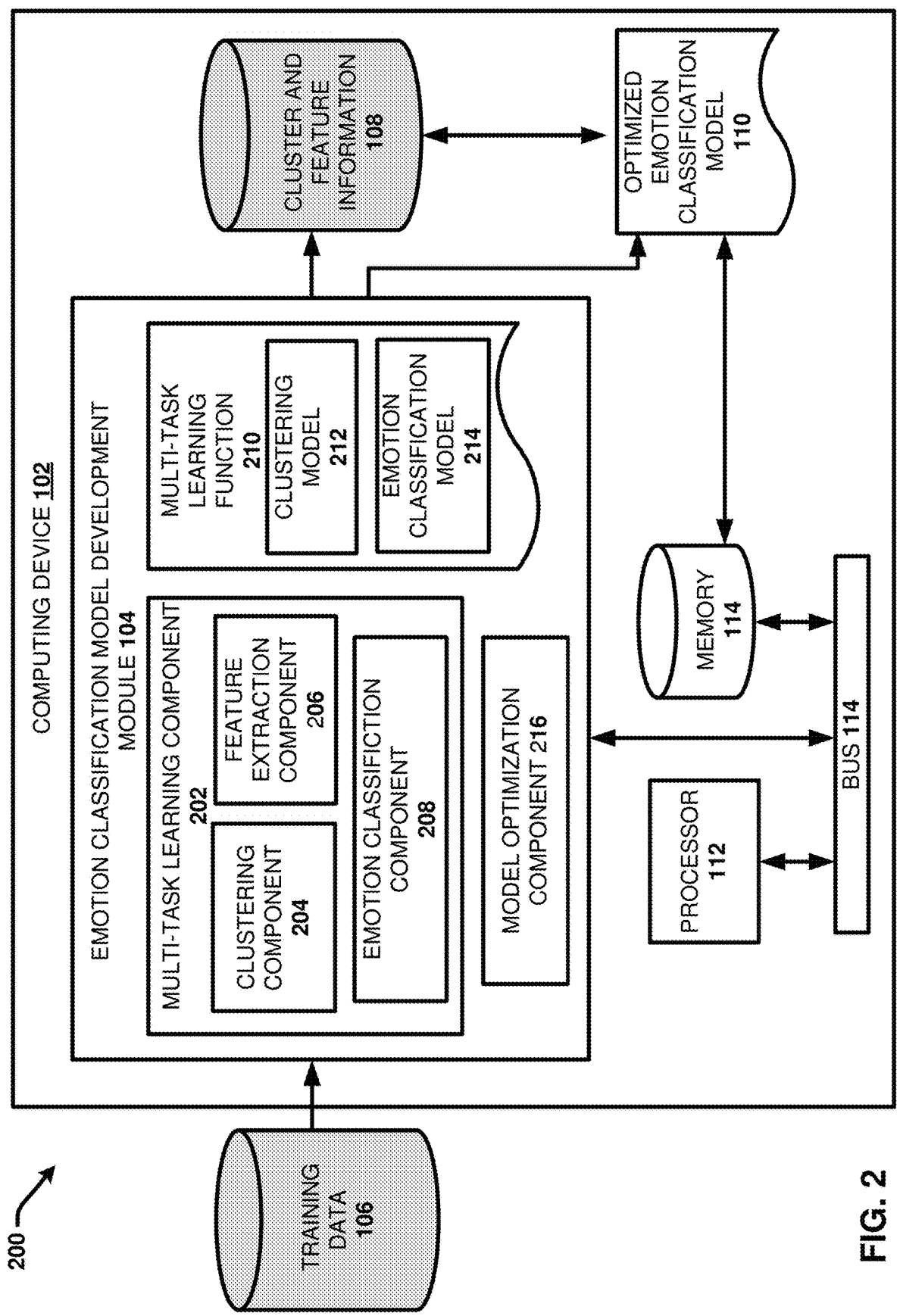
FIG. 2 illustrates a block diagram of another example, non-limiting system that facilitates automatically distinguishing between different expressions of a same or similar emotion in accordance with one or more embodiments of the disclosed subject matter.

FIG. 2 illustrates a block diagram of another example, non-limiting system 200 that facilitates automatically distinguishing between different expressions of a same or similar emotion in accordance with one or more embodiments of the disclosed subject matter. System 200 presents some example components of the emotion classification model development module 104 can perform operations associated with developing the optimized emotion classification model 110. In one or more embodiments, system 200 is subsystem of system 100 (e.g., system 100 can include system 200, and vice versa). Repetitive description of like elements employed in respective embodiments is omitted for sake of brevity.

In the embodiment shown, the emotion classification module development module can include a multi-task learning component 202, a multi-task learning function 210, and a model optimization component 216. As described with reference to FIG. 1 and system 100, in one or more embodiments, the emotion classification model development module 104 can generate the optimized emotion classification model 110 using a two-part process. In the embodiment shown, the multi-task learning component 202 can perform features and functionalities associated with the first part of the two-part process using the multi-task learning function 210 and the model optimization component 216 can perform features and functionalities associated with the second part of the two-part process using the cluster and feature information 108 and the emotion classification model 214 of the multi-task learning function 210.

With respect to the first part of the two-part process, the multi-task learning piece involves usage of the multi-task learning function 210 by the multi-task learning component 202 to generate the cluster and feature information 108. The multi-task learning function 210 involves a combined usage of a clustering model 212 and an emotion classification model 214 to train both models on the same set of training data 106 using an adversarial multi-task learning process. Multi-task learning (often referred to by the acronym MTL) is a subfield of machine learning in which multiple learning tasks are solved at the same time, while exploiting commonalities and differences across tasks. Clustering is the process of partitioning a set of data observations into multiple clusters so that the observations within a cluster are similar, and the observations in different clusters are dissimilar. In this regard, the multi-task learning function 210 can be considered a multi-task function because the multi-task learning function 210 combines the clustering model 212 and the emotion classification model 214 in a manner such that the output of the emotion classification model 214 controls the number of clusters determined by the clustering model 212 and their corresponding feature vector representations (e.g., the clustering process is dependent on the emotion classification task).

Figure 3:
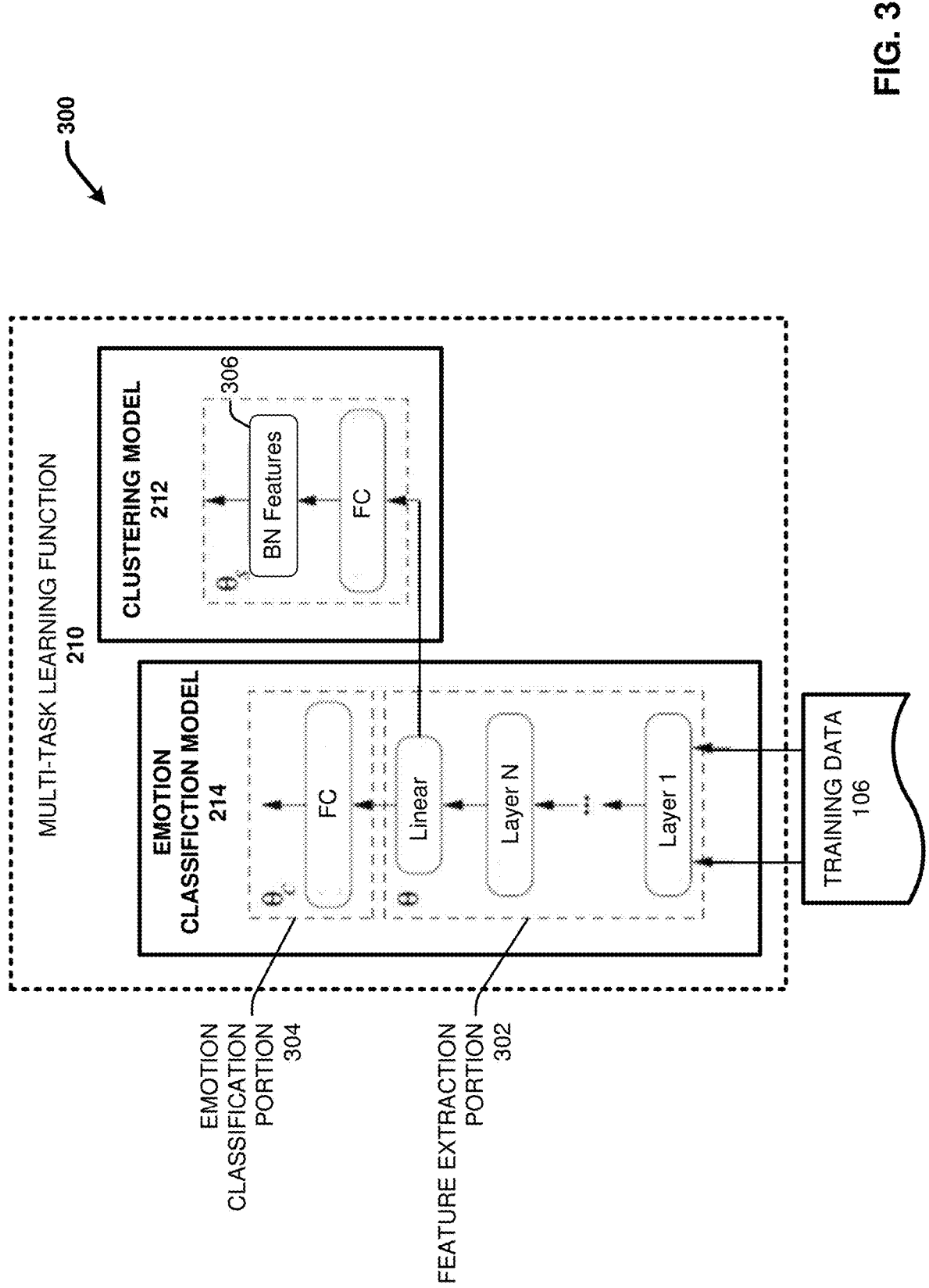
FIG. 3 illustrates an example, non-limiting block diagram of an adversarial multi-task learning framework in accordance with one or more embodiments of the disclosed subject matter.

For example, FIG. 3 provides an example diagram of an adversarial multi-task learning framework 300 in accordance with one or more embodiments of the disclosed subject matter. In one or more embodiments, the adversarial multi-task learning framework 300 can correspond to the multi-task learning function 210 (and vice versa). Repetitive description of like elements employed in respective embodiments is omitted for sake of brevity.

In the embodiment shown, the adversarial multi-task learning framework 300 includes the emotion classification model 214 and the clustering model 212. The emotion classification model 214 can include a standard recurrent neural network model with a feature extraction portion 302 and an emotion classification portion 304. The architecture of the emotion classification model 214 can vary. In one or more embodiments, the emotion classification model 214 can employ a deep learning neural network, a recurrent neural network (RRN), a long short-term memory (LSTM) model and the like. In some implementations, the feature extraction portion 302 of the emotion classification model 214 can employ a standard emotion recognition architecture that includes several convolution layers (e.g., ten), interleaved with max pooling and dropout layers. After all the convolution layers, the emotion classification portion 304 can include one or more fully connected (FC) dense layers with hidden nodes (e.g., two dense layers each with 512 hidden nodes). For example, in the embodiment shown, the feature extraction portion 302 can include a plurality of neural network layers (e.g., layers 1-N, wherein N is an integer), such as one or more LSTM deep learning neural network layers or the like. The respective layers can process the training data 106 to determine feature representations reflected in the respective input images. For example, the some of the extracted features that can be determined from the image data can include defined geometrical properties and relationships between facial features depicted in the raw pixel data. The output of the feature extraction portion 302 can be employed by the higher FC layers of the emotion classification portion 304 to determine the emotion type reflected by a particular feature representation associated with each input image.

In addition, the output of the feature extraction portion 302 can be employed by the clustering model 212 to cluster the training data 106 into one or more clusters. For example, with respect to training data that comprises facial expression data corresponding to thousands (or more or less) of facial expressions, the clustering model 212 can generate different clusters of the facial expression data based on the output of the feature extraction portion 302 of the emotion classification model 214 (e.g., extracted features), wherein the observations or characteristics within a cluster similar (e.g., images of people of a same age group, images of people of a same background, etc.), and wherein observations of the different clusters are dissimilar (e.g., clusters associated with different age groups, clusters associated with different backgrounds etc.). The clustering model 312 employed can vary. In one implementation, the clustering model 312 can employ K-means to perform the clustering based on the extracted features, such as the extracted bottleneck features (BN features 306). In other implementations, the clustering model 412 can include a universal background model (UBM) model. In another implementation, the clustering model 412 can include an adapted gaussian mixture model (GMM) model. Still in other implementations, the clustering model 412 can combine the UBM model and the GMM model and employ the differences between the models to do feature extraction and clustering.

With reference to FIGS. 2 and 3, the multi-task learning component 202 can include a clustering component 204, feature extraction component 206 and emotion classification component 208. The clustering component 204 can perform the clustering process of the multi-task learning function 210 using the clustering model 212 to cluster or partition the training data 106 into different subsets or clusters, wherein the observations within a cluster are similar, and the observations in different clusters are dissimilar. In some embodiments, the clustering component 204 can employ the feature extraction component 206 to facilitate clustering and extracting or determining the distinguishing feature representations or feature vectors that represent the different clusters. In one or more implementations, the distinguishing feature representations for each cluster, (or in some implementations one or more clusters), can be determined using a bottleneck approach, wherein the distinguishing features correspond to bottleneck (BN) features (e.g., identified in FIG. 3 as BN feature 306). For example, in neural network processing, bottleneck features correspond to vectors consisting of the activations at a bottleneck layer, which has a relatively small number of hidden units compared to the other hidden layers in the network. The bottleneck layer can be used to obtain a representation of the input with reduced dimensionality. In this regard, the bottleneck features determined for the respective cluster can correspond to a subset of one or more facial feature parameters that uniquely distinguish each cluster.

The emotion classification component 208 can apply the emotion classification model 214 to the training data 106 to classify emotion types corresponding to respective emotion representations included in the training data 106. For example, in implementations in which the emotion classification model 214 comprises a facial expression classification model, the emotion classification component 208 can employ the emotion classification model 214 to determine emotions types reflected in different facial expressions captured in images of people included in the training data.

In accordance with the multi-task learning function 210, in order to determine the optimal number of clusters to partition the training data into, the clustering component 204 can iteratively generate an increasing number of clusters based on one or more distinguishing characteristics associated with the respective clusters (e.g., using the clustering model 212). In particular, based on features extracted from the training data 106 (e.g., features extracted from image pixels corresponding to different images of face with different facial expressions), the clustering component 204 can initial generate two or more distinct clusters. In some embodiments, the initial clusters that are generated can be facilitated based on some metadata if provided or if the metadata can be easily determined. For example, based on analysis of facial features, metadata can be determined and used to determine the initial clusters. However, in other embodiments, the initial clusters can be determined using the data driven clustering methods alone, without usage or determination of any metadata. In one embodiment, the number of initial clusters can be defined (e.g., two, three, etc.). In other embodiments, the number of initial clusters can be based on the training data, the associated features, and the clustering model 212 employed.

The emotion classification component 208 can further determine the emotion classifications for the initial clusters using the emotion classification model 214. In particular, the emotion classification component 208 can apply the emotion classification model 214 to determine the emotion types respectively associated with the facial feature representations included in the respective initial clusters. In association with training the emotion classification model on the different clusters, the emotion classification component 208 can determine the classification rate associated with each iteration of clusters. In this regard, the emotion classification rate can reflect the percentage or degree of accuracy achieved by the emotion classification model relative to the different clusters.

After the initial clusters have been determined and evaluated by the emotion classification model, the clustering component 204 and the emotion classification component 208 can repeat the process, increasing the cluster number by one or more each iteration. For example, assuming the initial clustering resulted in generation of M clusters, after the initial clustering and classification, the clustering component 204 can partition the training data into M+N clusters using the bottleneck features (or distinguishing feature representation) to determine the next clustering division. In some implementations, N can be 1. In other implementations, N can be another integer greater than 1. The emotion classification component 208 can determine the emotion classification rate associated with each new iteration of clusters. Based on the clustering, the emotion classification rate will steadily increase with each new iteration of clusters. However, at some point when the clustering number becomes too small and thus too specific to have a positive impact on the emotion classification, the emotion classification rate will drop. Thus, in various embodiments, the multi-task learning component 202 can determine the final clustering number based on the number of clusters determined at an iteration when the emotion classification rate drops. For example, the final number of clusters can include the preceding number of clusters determined in the iteration immediately preceding the emotion classification rate drop (e.g., if the rate drops at 10 clusters, the optimal or final number of clusters can be the preceding 9 clusters). The multi-task learning component 202 can determine the cluster and feature information 108 for the final clusters after observing the emotion classification rate drop.

Once the cluster and feature information 108 has been generated, the model optimization component 216 can employ the cluster and feature information 108 to train the emotion classification model 214 to learn how to recognize the distinguishing feature representations corresponding to the determined emotion types included in the cluster and feature information and classify the facial expressions accordingly. In some implementations, the model optimization component 216 can train the emotion classification model based on the cluster and feature information 108 using the training data 106 again. For example, in implementations in which the respective feature representations included in the cluster and feature information 108 correspond to bottleneck features, the model optimization component 216 can include the final bottleneck features as additional features to append to the emotion recognition network input and train the emotion classification model 214 to identify end user the bottleneck features to tailor emotion classification to reflect the impact of the bottleneck features. Once the emotion classification model has been trained to recognize and classify facial expression data based on the determined feature representation included in the cluster and feature information 108, the emotion classification model 214 can become the optimized emotion classification model 110.

Figure 4:
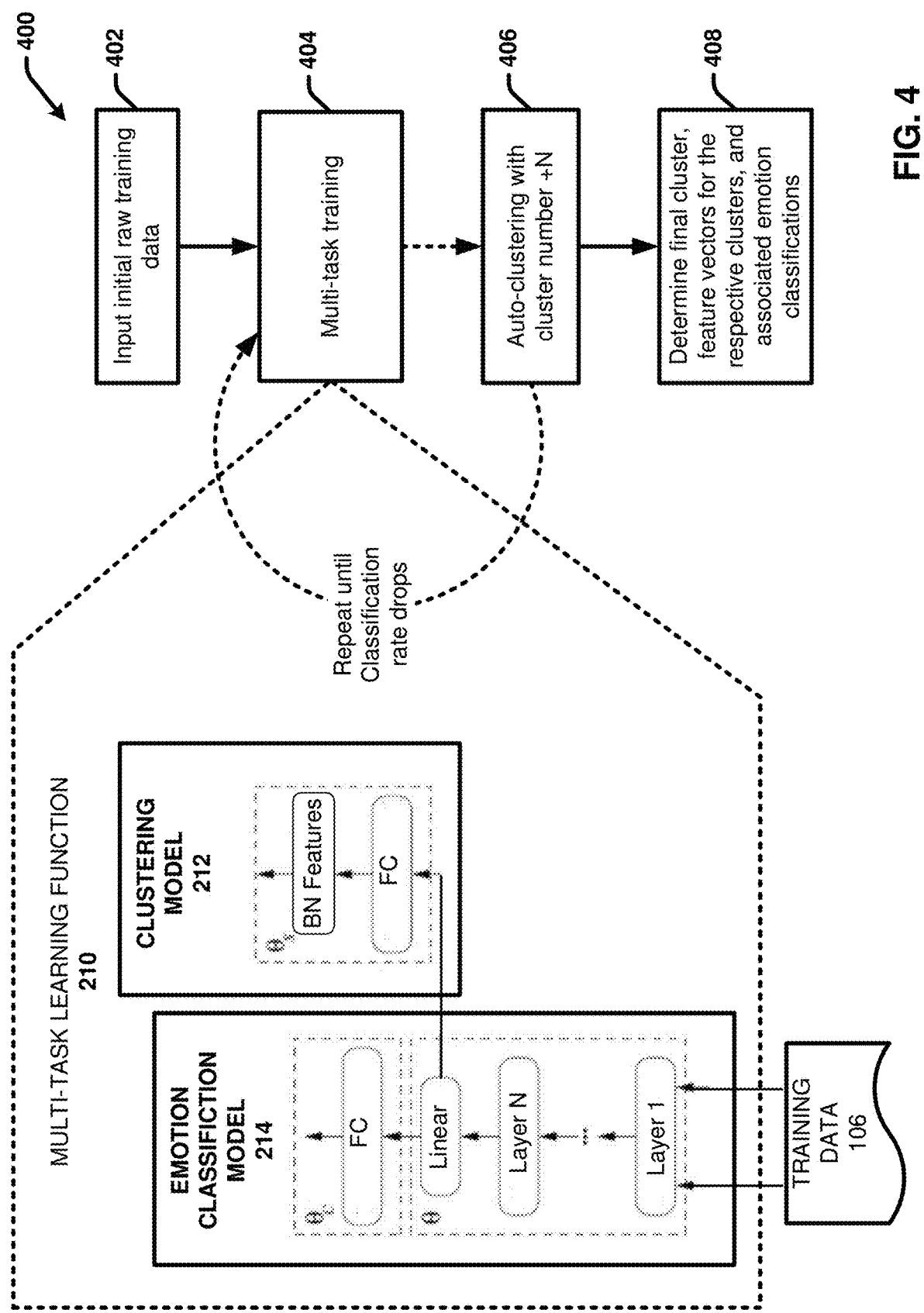
FIG. 4 illustrates an example, high level flow diagram of a computer-implemented process for determining clustering and feature information using an adversarial multi-task learning framework in accordance with one or more embodiments of the disclosed subject matter.

FIG. 4 illustrates an example, high level flow diagram of a computer-implemented process 400 for determining clustering and feature information using an adversarial multi-task learning framework in accordance with one or more embodiments of the disclosed subject matter. In one or more embodiments, process 500 can be performed by the computing device 102 of systems 100 or 200 using the emotion classification model development module 104. Repetitive description of like elements employed in respective embodiments is omitted for sake of brevity.

At 402, the emotion classification model development module 104 can receive the initial raw training data (e.g., training data 106). For example, in various embodiments, the initial raw training data can include raw pixelated images of different facial expression corresponding to different emotions as expressed by a variety of different people. At 404, the emotion classification model development module 104 can employ the multi-task learning function 210 to perform an adversarial multi-task learning process that involves clustering the input data based on extracted features associated therewith (e.g., distinguishing BN features) and classifying the images in the respective clusters with emotion classifications using the emotion classification model 214 (e.g., using the multi-task learning component 202). The extracted bottleneck features can then be used at 406 to automatically determine a new set of clusters with the cluster number increased by N (e.g., +1, +2, etc.). This is an iterative process which can be repeated until the classification rate drops. For example, using the multi-task learning function 210, one or more bottleneck features can be determined which can further be used to determine the next set of clusters. The next set of clusters can then be classified with emotion classifications associated with the images included therein. If the classification rate has not dropped, the bottleneck features can again be used to do another clustering with an incremental cluster number. Each next set of clusters can be classified and the multi-task learning process can be iteratively repeated with an incremental cluster number until the emotion classification rate drops. Once the emotion classification rate drops, the final number of clusters, the feature vectors for the respective clusters, and the associated emotion classifications can be determined at 408.

Figure 5:
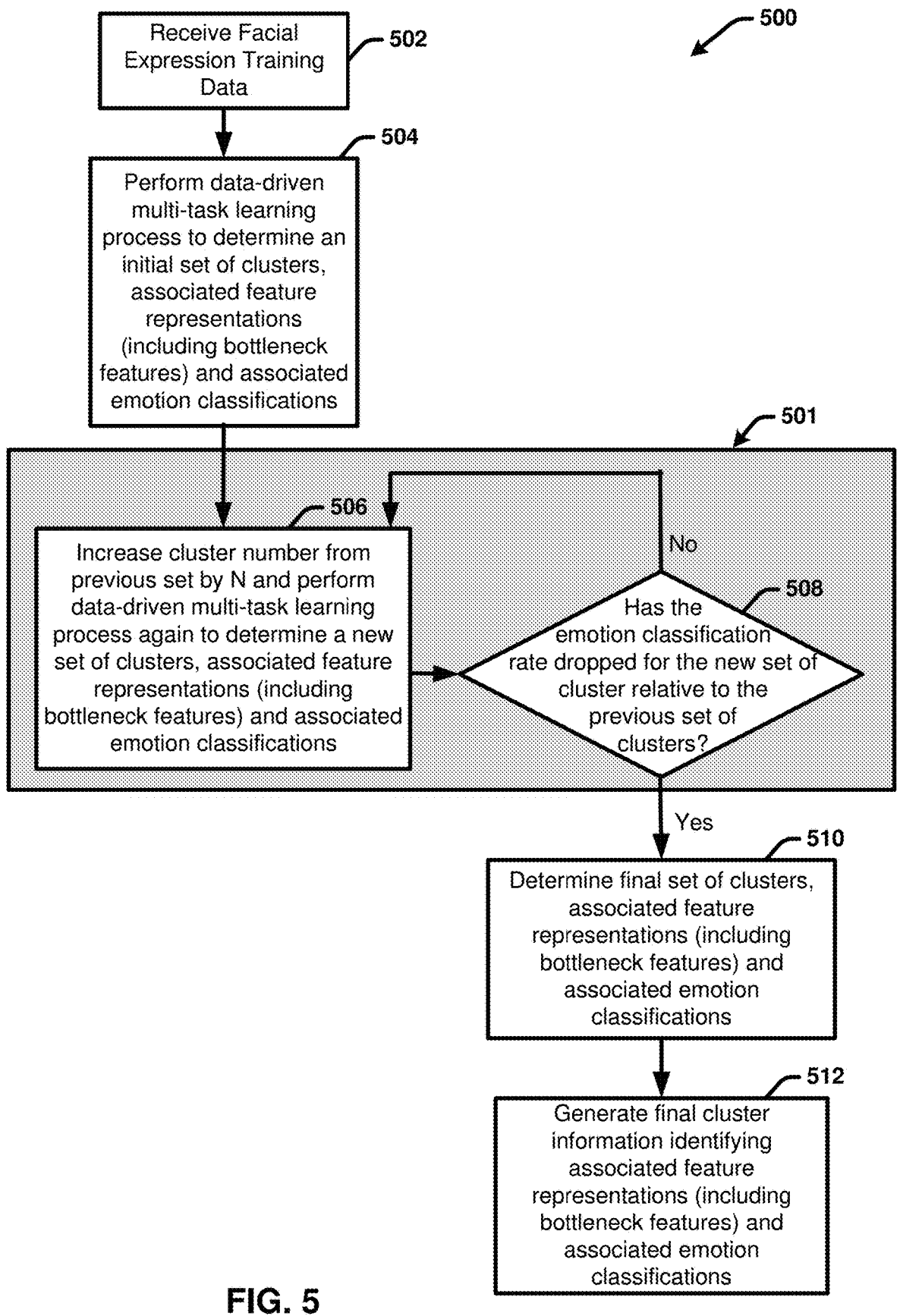
FIG. 5 illustrates an example non-limiting computer-implemented process for employing an adversarial multi-task learning framework to determine granular emotion classifications based on facial expression variation information in accordance with one or more embodiments of the disclosed subject matter.

FIG. 5 provides a flow diagram of an example non-limiting computer-implemented process 500 for employing an adversarial multi-task learning framework to determine granular emotion classifications based on facial expression variation information in accordance with one or more embodiments of the disclosed subject matter. In one or more embodiments, process 500 can be performed by the computing device 102 of systems 100 or 200 using the emotion classification model development module 104. Repetitive description of like elements employed in respective embodiments is omitted for sake of brevity.

At 502, the emotion classification model development module 104 can receive facial expression training data (e.g., training data 106). At 504, the emotion classification model development module 104 can perform a data-driven multi-task learning process (e.g., using the multi-task learning component 202) to determine an initial set of clusters (e.g., using the clustering component 204), associated feature representations including bottleneck features (e.g., using the clustering component 204 and/or the feature extraction component 206), and associated emotion classifications (e.g., using the emotion classification component 208) from the training data. At 504, the emotion classification model development module 104 can perform a data-driven multi-task learning process again but with an increase in cluster number. In this regard, the clustering component 204 can increase cluster number from the previous set by N (e.g., wherein N is 1 or another defined integer) and perform the data-driven multi-task learning process again to determine a new set of clusters, associated feature representations (including bottleneck features) and associated emotion classifications (e.g., using the clustering component 204, the feature extraction component 206, and the emotion classification component 208).

At 508, the emotion classification model development module 104 can determine whether the emotion classification rate has dropped for the new set of clusters relative to the previous set of clusters. If the emotion classification rate has not dropped, process 500 proceeds back to 506 and wherein the multi-task learning component repeats the multi-task learning process for a new set of clusters. In this regard, the clustering component 204 can increase the cluster number from the previous set by N (e.g., wherein N is 1 or another defined integer) and perform data-driven multi-task learning process again to determine another new set of clusters, associated feature representations (including bottleneck features) and associated emotion classifications (e.g., using the clustering component 204, the feature extraction component 206, and the emotion classification component 208).

The grey box 501 including processing steps 506 and 508 corresponds to an iterative sub-process of process 500. In this regard, processing steps 506 to 508 can be iteratively repeated until the decision at 508 is a determination that the emotion classification rate associated with the current set of clusters has dropped. At this point, process 500 proceeds to 510, wherein the emotion classification model development module 104 determines the final set of clusters (including the final number of clusters), their associated feature representations (including bottleneck features), and their associated emotion classifications. At 512, the emotion classification model development module 104 can further generate final cluster information identifying associated feature representations (including bottleneck features) and associated emotion classifications (e.g., the cluster and feature information 108).

Figure 6:
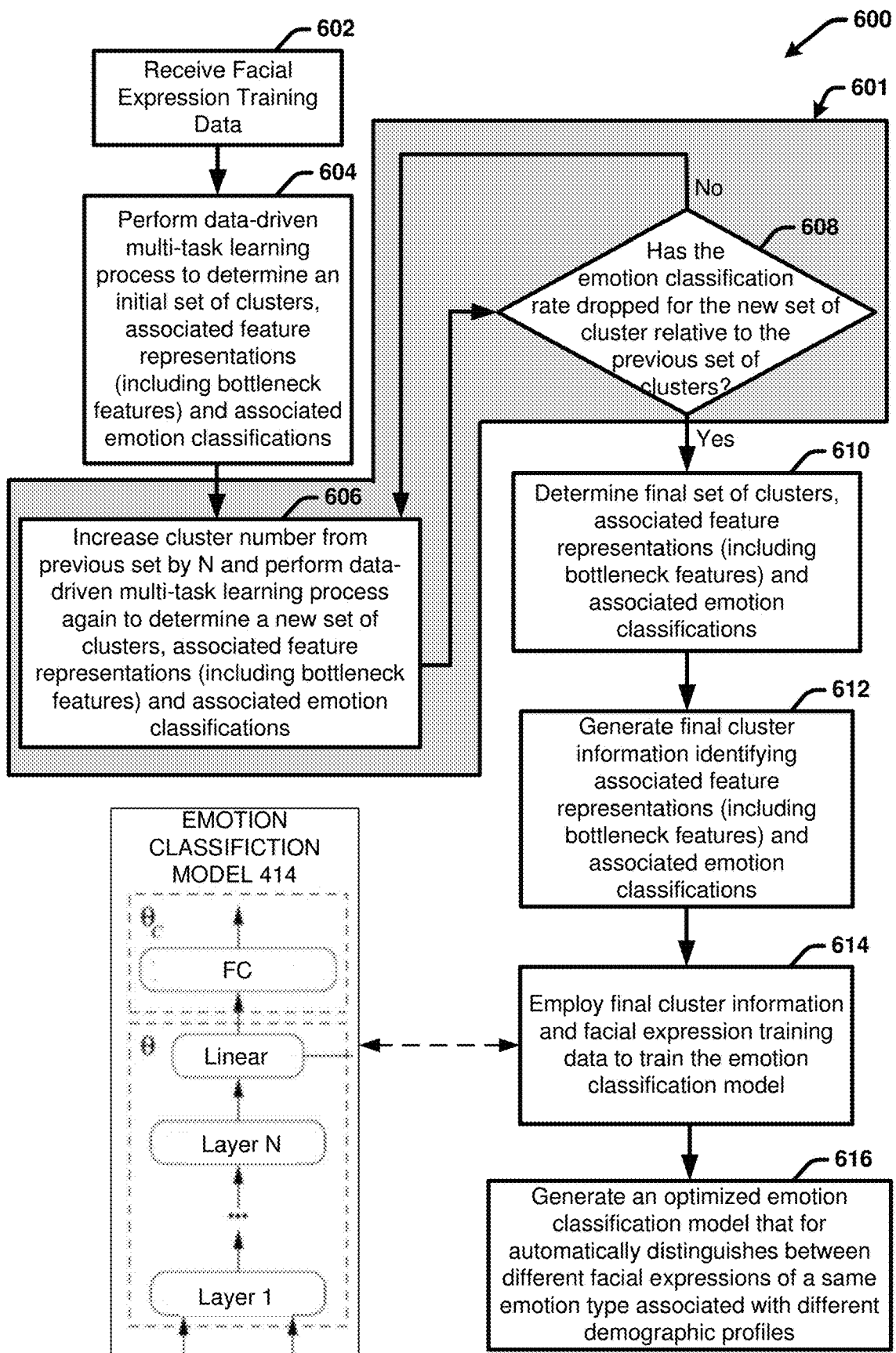
FIG. 6 illustrates an example non-limiting computer-implemented process for employing an adversarial multi-task learning framework to determine granular emotion classifications based on facial expression variation information in accordance with one or more embodiments of the disclosed subject matter.

FIG. 6 provides a flow diagram of an example non-limiting computer-implemented process 600 for employing an adversarial multi-task learning framework to determine granular emotion classifications based on facial expression variation information in accordance with one or more embodiments of the disclosed subject matter. In one or more embodiments, process 600 can be performed by the computing device 102 of systems 100 or 200 using the emotion classification model development module 104. Repetitive description of like elements employed in respective embodiments is omitted for sake of brevity.

At 602, the emotion classification model development module 104 can receive facial expression training data (e.g., training data 106). At 604, the emotion classification model development module 104 can perform a data-driven multi-task learning process (e.g., using the multi-task learning component 202) to determine an initial set of clusters (e.g., using the clustering component 204), associated feature representations including bottleneck features (e.g., using the clustering component 204 and/or the feature extraction component 206), and associated emotion classifications (e.g., using the emotion classification component 208) from the training data. At 604, the emotion classification model development module 104 can perform a data-driven multi-task learning process again but with an increase in cluster number. In this regard, the clustering component 204 can increase cluster number from the previous set by N (e.g., wherein N is 1 or another defined integer) and perform the data-driven multi-task learning process again to determine a new set of clusters, associated feature representations (including bottleneck features) and associated emotion classifications (e.g., using the clustering component 204, the feature extraction component 206, and the emotion classification component 208).

At 608, the emotion classification model development module 104 can determine whether the emotion classification rate has dropped for the new set of clusters relative to the previous set of clusters. If the emotion classification rate has not dropped, process 600 proceeds back to 606 and wherein the multi-task learning component repeats the multi-task learning process for a new set of clusters. In this regard, the clustering component 204 can increase the cluster number from the previous set by N (e.g., wherein N is 1 or another defined integer) and perform data-driven multi-task learning process again to determine another new set of clusters, associated feature representations (including bottleneck features) and associated emotion classifications (e.g., using the clustering component 204, the feature extraction component 206, and the emotion classification component 208).

The grey box 601 including processing steps 606 and 608 corresponds to an iterative sub-process of process 600. In this regard, processing steps 606 to 608 can be iteratively repeated until the decision at 608 is a determination that the emotion classification rate associated with the current set of clusters has dropped. At this point, process 600 proceeds to 610, wherein the emotion classification model development module 104 determines the final set of clusters (including the final number of clusters), their associated feature representations (including bottleneck features), and their associated emotion classifications. At 612, the emotion classification model development module 104 can further generate final cluster information identifying associated feature representations (including bottleneck features) and associated emotion classifications (e.g., the cluster and feature information 108).

At 614, the emotion classification model development module 104 can employ the final cluster information and facial expression training data to train the emotion classification model 214 (e.g., using the model optimization component 216). At 616, the emotion classification model development module 104 can generate an optimized emotion classification model that for automatically distinguishes between different facial expressions of a same emotion type associated with different demographic profiles (e.g., using the model optimization component 216).

Figure 7:
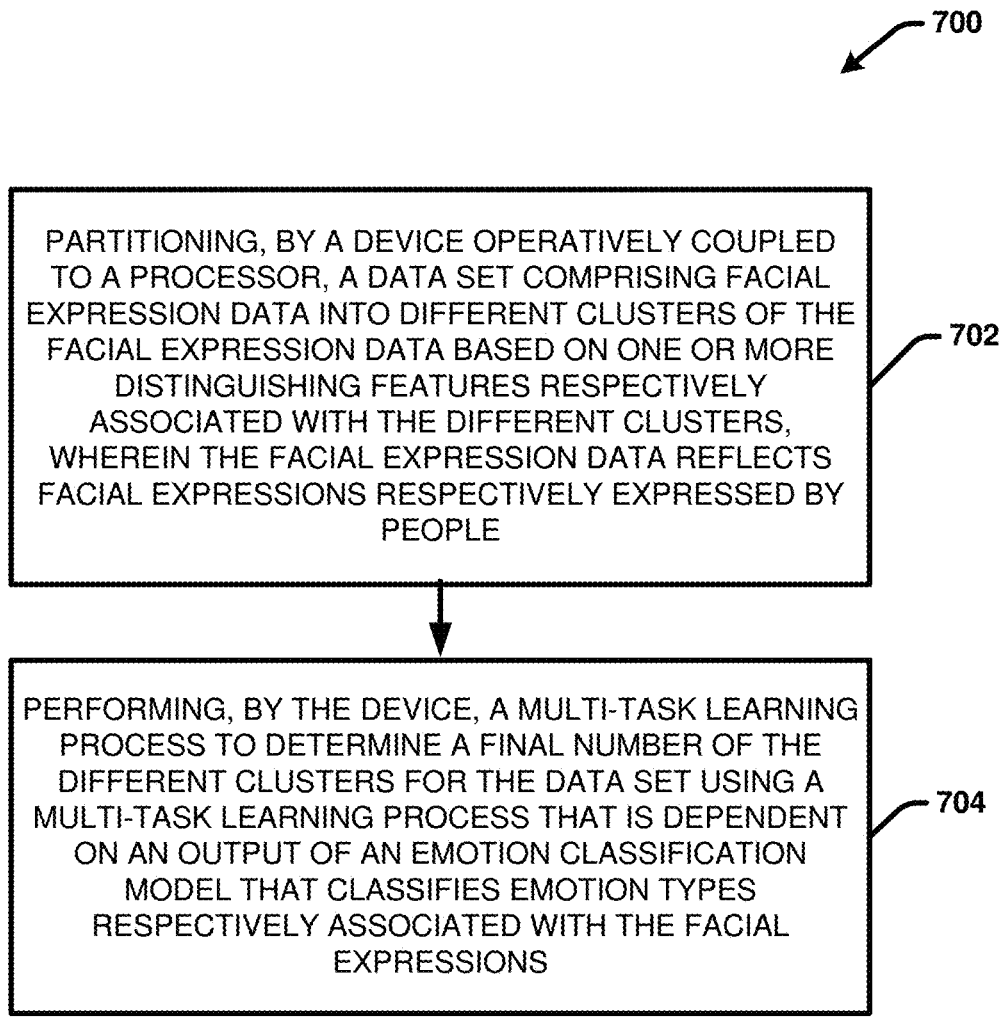
FIG. 7 illustrates an example non-limiting computer-implemented process for employing an adversarial multi-task learning framework to determine granular emotion classifications based on facial expression variation information in accordance with one or more embodiments of the disclosed subject matter.

FIG. 7 provides another flow diagram of an example non-limiting computer-implemented process 700 for employing an adversarial multi-task learning framework to determine granular emotion classifications based on facial expression variation information in accordance with one or more embodiments of the disclosed subject matter. Repetitive description of like elements employed in respective embodiments is omitted for sake of brevity.

At 702, a device operatively coupled to a processor, partitions a data set comprising facial expression data into different clusters of the facial expression data based on one or more distinguishing features respectively associated with the different clusters (e.g., using clustering component 204), wherein the facial expression data reflects facial expressions respectively expressed by people. At 704, the device performs a multi-task learning process (e.g., using multi-task learning component 202) to determine a final number of the different clusters for the data set using a multi-task learning process that is dependent on an output of an emotion classification model (e.g., emotion classification model 214) that classifies emotion types respectively associated with the facial expressions.

Figure 8:
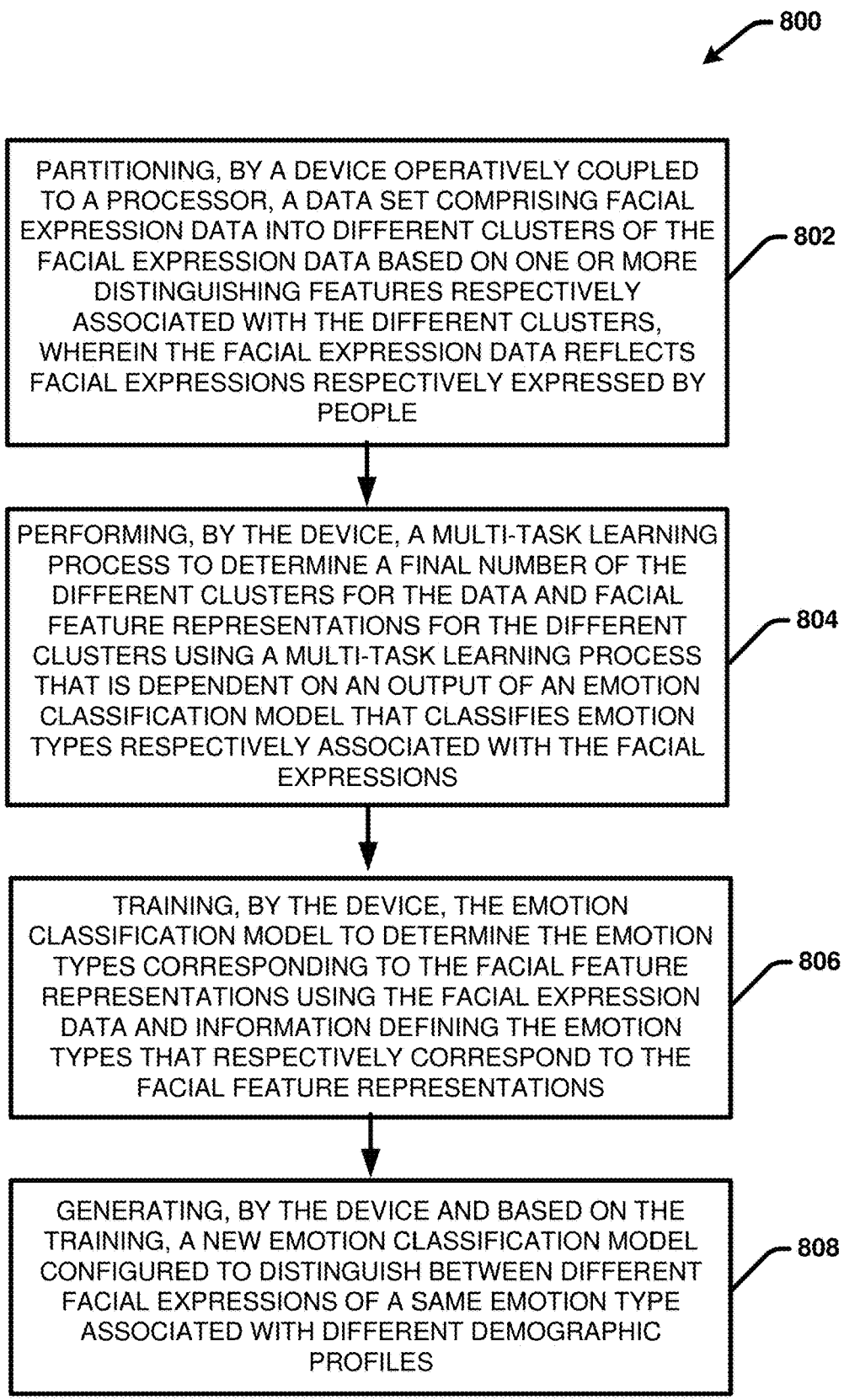
FIG. 8 illustrates an example non-limiting computer-implemented process for employing an adversarial multi-task learning framework to determine granular emotion classifications based on facial expression variation information in accordance with one or more embodiments of the disclosed subject matter.

FIG. 8 provides another flow diagram of an example non-limiting computer-implemented process 800 for employing an adversarial multi-task learning framework to determine granular emotion classifications based on facial expression variation information in accordance with one or more embodiments of the disclosed subject matter. Repetitive description of like elements employed in respective embodiments is omitted for sake of brevity.

At 802, a device operatively coupled to a processor, partitions a data set comprising facial expression data into different clusters of the facial expression data based on one or more distinguishing features respectively associated with the different clusters (e.g., using clustering component 204), wherein the facial expression data reflects facial expressions respectively expressed by people. At 804, the device performs a multi-task learning process (e.g., using multi-task learning component 202) to determine a final number of the different clusters for the data and facial feature representations for the different clusters using a multi-task learning process that is dependent on an output of an emotion classification model (e.g., emotion classification model 214) that classifies emotion types respectively associated with the facial expressions. At 806, the device, trains the emotion classification model to determine the emotion types corresponding to the facial feature representations using the facial expression data and information defining the emotion types that respectively correspond to the facial feature representations (e.g., using the model optimization component 216). At 808, the device generates, based on the training, a new emotion classification model (e.g., optimized emotion classification model 110) configured to distinguish between different facial expressions of a same emotion type associated with different demographic profiles (e.g., using the model optimization component 216).

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
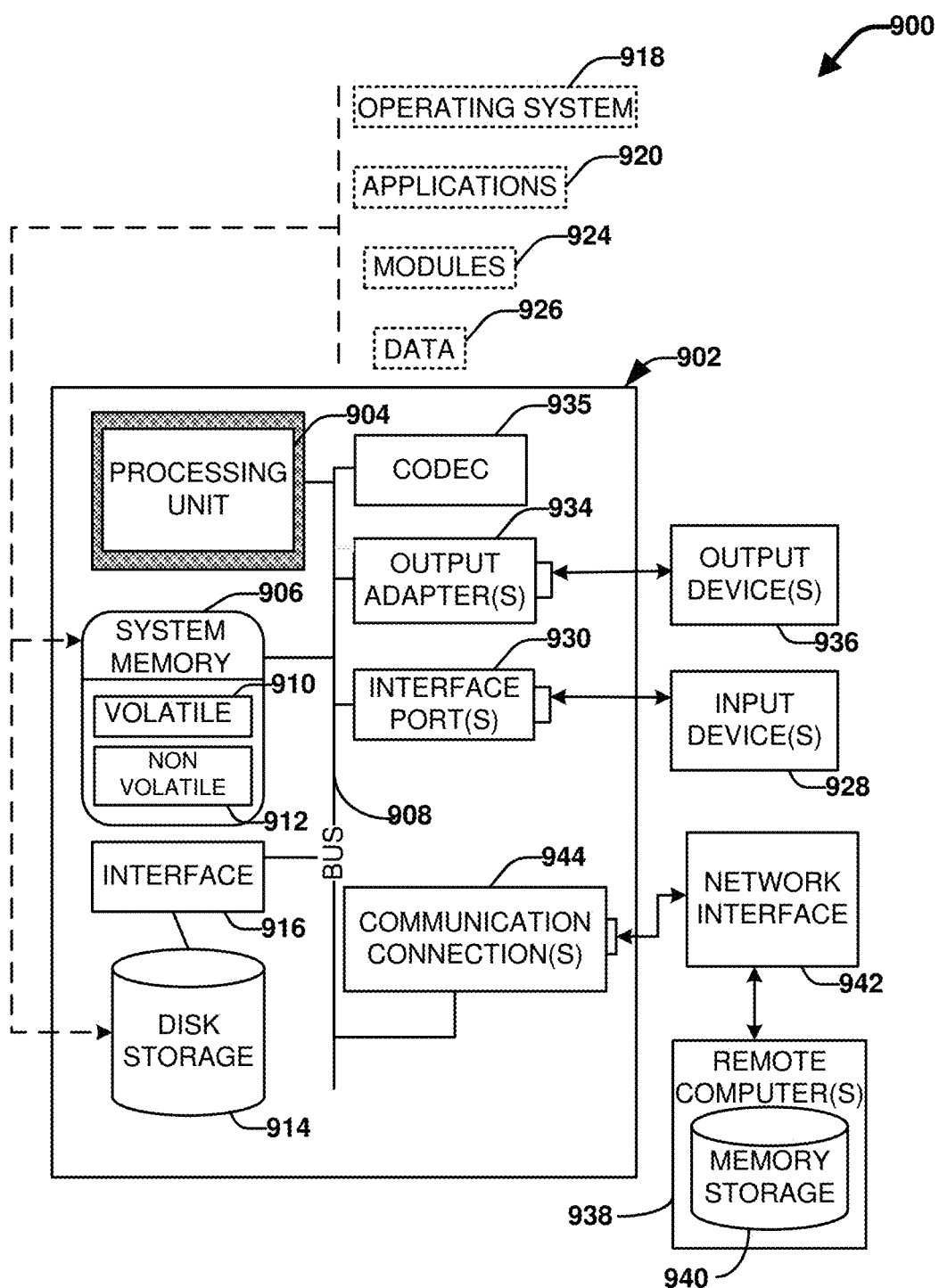
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include removable/non-removable, volatile/non-volatile computer storage medium. FIG. 9 illustrates, for example, disk storage 914. Disk storage 914 includes, but is not limited to, devices like a magnetic disk drive, solid state disk (SSD), flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 914 to the system bus 908, a removable or non-removable interface is typically used, such as interface 916. It is appreciated that disk storage 914 can store information related to an entity. Such information might be stored at or provided to a server or to an application running on an entity device. In one embodiment, the entity can be notified (e.g., by way of output device(s) 936) of the types of information that are stored to disk storage 914 or transmitted to the server or application. The entity can be provided the opportunity to opt-in or opt-out of having such information collected or shared with the server or application (e.g., by way of input from input device(s) 928).

It is to be appreciated that FIG. 9 describes software that acts as an intermediary between entities and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

An entity enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   partitioning, by a device operatively coupled to a processor, a data set comprising facial expression data into different clusters of the facial expression data based on one or more distinguishing features respectively associated with the different clusters, wherein the facial expression data reflects facial expressions respectively expressed by people; and
   performing, by the device, a multi-task learning process to determine a final number of the different clusters for the data set using-a multi-task learning process that is dependent on an output of an emotion classification model that classifies emotion types respectively associated with the facial expressions.

2. The computer implemented method of claim 1, further comprising:
   training, by the device, the emotion classification model to determine the emotion types corresponding to facial feature representations using the facial expression data and information defining emotion types that respectively correspond to the facial feature representations; and
   generating, by the device and based on the training, a new emotion classification model configured to distinguish between different facial expressions of a same emotion type associated with different demographic profiles.

3. The computer implemented method of claim 2, wherein the facial feature representations respectively comprise two or more different facial feature representations for the same emotion type of the emotion types.

4. The computer implemented method of claim 3, wherein the two or more different facial feature representations are associated with different demographic profiles.

5. The computer implemented method of claim 1, wherein the performing the multi-task learning process further comprises determining facial feature representations for the different clusters.

6. The computer implemented method of claim 1, wherein the facial expression data comprises respective images of faces of the people with the facial expressions.

7. The computer implemented method of claim 1, wherein the people are respectively associated with different demographic profiles.

8. A system, comprising:
   a memory that stores computer executable components;
   a processor that executes the computer executable components stored in the memory, wherein the computer executable components comprise:
      a clustering component that partitions a data set comprising facial expression data into different clusters of the facial expression data based on one or more distinguishing features respectively associated with the different clusters, wherein the facial expression data reflects facial expressions respectively expressed by people; and a multi-task learning component that determines a final number of the different clusters for the data set using a multi-task learning process that is dependent on an output of an emotion classification model that classifies emotion types respectively associated with the facial expressions.

9. The system of claim 8, further comprising:
a model optimization component that:
trains the emotion classification model to determine the emotion types corresponding to facial feature representations using the facial expression data and information defining emotion types that respectively correspond to the facial feature representations; and
generates, based on the training, a new emotion classification model configured to distinguish between different facial expressions of a same emotion type associated with different demographic profiles.

10. The system of claim 9, wherein the facial feature representations respectively comprise two or more different facial feature representations for the same emotion type of the emotion types.

11. The system of claim 10, wherein the two or more different facial feature representations are associated with different demographic profiles.

12. The system of claim 8, wherein the multi-task learning component determines facial feature representations for the different clusters.

13. The system of claim 8, wherein the facial expression data comprises respective images of faces of the people with the facial expressions.

14. The system of claim 8, wherein the people are respectively associated with different demographic profiles.

15. A computer program product facilitating automatically distinguishing between different facial expressions of a same emotion type associated with different demographic profiles, the computer program product comprising a non-transitory computer readable medium having program instructions embodied therewith, the program instructions executable by a processor to cause the processor to:

partition a data set comprising facial expression data into different clusters of the facial expression data based on one or more distinguishing features respectively associated with the different clusters, wherein the facial expression data reflects facial expressions respectively expressed by people; and determine a final number of the different clusters for the data set using a multi-task learning process that is dependent on an output of an emotion classification model that classifies emotion types respectively associated with the facial expressions.

16. The computer program product of claim 15, wherein the program instructions executable by the processor to further cause the processor to:
train the emotion classification model to determine the emotion types corresponding to facial feature representations using the facial expression data and information defining emotion types that respectively correspond to the facial feature representations; and
generate, based on the training, a new emotion classification model configured to distinguish between different facial expressions of a same emotion type associated with different demographic profiles.

17. The computer program product of claim 16, wherein the facial feature representations respectively comprise two or more different facial feature representations for the same emotion type of the emotion types.

18. The computer program product of claim 17, wherein the two or more different facial feature representations are associated with different demographic profiles.

19. The computer program product of claim 15, wherein the multi-task learning component determines facial feature representations for the different clusters.

20. The computer program product of claim 15, wherein the facial expression data comprises respective images of faces of the people with the facial expressions.

* * * * *